United States Patent [19]

Kaule

[11] Patent Number: 5,516,153
[45] Date of Patent: May 14, 1996

[54] SECURITY DOCUMENT AND A METHOD FOR PRODUCING IT

[75] Inventor: Wittich Kaule, Munich, Germany

[73] Assignee: GAO Gesellschaft fur Automation und Organisation mbH, Germany

[21] Appl. No.: 391,275

[22] Filed: Feb. 21, 1995

Related U.S. Application Data

[63] Continuation of Ser. No. 822,317, Jan. 17, 1992, abandoned.

[30] Foreign Application Priority Data

Jan. 17, 1991 [DE] Germany ............... 41 01 301.8

[51] Int. Cl.$^6$ ................... B42D 15/02
[52] U.S. Cl. ............... 283/85; 283/82; 283/83; 283/901; 427/7; 428/915; 162/140
[58] Field of Search ............... 283/87, 70, 72, 283/82, 83, 85, 91, 901, 904; 428/915, 916, 208, 209; 162/106, 125, 140; 427/7

[56] References Cited

U.S. PATENT DOCUMENTS

| | | | |
|---|---|---|---|
| 3,790,754 | 2/1974 | Black et al. | 235/380 |
| 4,114,032 | 9/1978 | Brosow et al. | 235/493 |
| 4,183,989 | 1/1980 | Tooth | 428/916 X |
| 4,517,268 | 5/1985 | Gruber et al. | 430/39 |
| 4,631,223 | 12/1986 | Sander | 283/82 X |
| 4,652,015 | 3/1987 | Crane | 283/58 X |
| 5,223,360 | 6/1993 | Prengel et al. | 430/39 |

FOREIGN PATENT DOCUMENTS

| | | |
|---|---|---|
| 0310707 | 12/1989 | European Pat. Off. . |
| 1411477 | 10/1975 | United Kingdom . |

*Primary Examiner*—Peter Vo
*Assistant Examiner*—Khan V. Nguyen
*Attorney, Agent, or Firm*—Bacon & Thomas

[57] ABSTRACT

A security element for use in a security document such as a bank note, identity card or the like includes at least a partial metallic coating on a substrate and wherein the metallic coating includes recesses in the forms of characters or patterns that are visually recognizable at least in transmitted light and a magnetic coating of soft-magnetic pigments disposed in overlying relationship with the metallic coating. A security document containing the security element is also described. Various arrangements of metallic and magnetic coatings and a method of producing the security element are also described,

14 Claims, 2 Drawing Sheets

SECURITY DOCUMENT AND A METHOD FOR PRODUCING IT

This application is a continuation of application Ser. No. 07/822,317, filed Jan. 17, 1992, abandoned.

FIELD OF THE INVENTION

The present invention relates to a security document, in particular a bank note, identity card or the like, having a security element consisting of a carrier film provided with magnetic properties, and to a method for producing the security document.

BACKGROUND OF THE PRIOR ART

Such a security document is known from German patent no. 16 96 245. According to the method described in this publication, a suitable carrier material, such as silk, cotton or plastics, is provided with a magnetic coating mixture and then embedded in the security document. If the security element is designed as a safeguarding thread, the magnetic band can additionally be coated on both sides with an opaque white coating slip. This prevents the dark ferromagnetic material from being detected without aid. It is a particular advantage of this safeguarding thread that it is almost impossible to detect visually in incident light (reflection) due to the high luminous reflectance on the white coating and the light scatter in the paper layer covering the safeguarding thread, but stands out very clearly from its surroundings as a dark coat in transmitted light. In addition the magnetic properties are clearly identifiable by machine.

However, it is increasingly proving to be disadvantageous that the magnetic properties can conceivably be imitated, at least to a limited extent, using commercially available magnetic tape materials (sound tapes, video tapes, etc.). Furthermore, most oxidic magnetic pigments are so dark that a complete white cover cannot be obtained with reasonable layer thicknesses. A safeguarding thread which is almost invisible in incident light is thus very difficult or even impossible to obtain with conventional means.

To make imitation more difficult, security documents are now frequently provided with additional security features which commercial magnetic tapes do not have. German patent no. 27 54 267 describes e.g. a security document having a security element with at least two different physical properties which can be checked independently of each other. One of the physical properties is fundamentally of magnetic nature. Magnetic materials with high coercive field strength and remanence are preferably used to protect magnetization codes from accidental demagnetization. A UV fluorescent material can be applied congruently to the magnetic patterns. Alternatively, an electrically conductive aluminum coating can be provided.

The production of such security elements is thus very elaborate and expensive since many individual phases of operation are necessary to apply the individual materials with the various physical properties successively and partly even in exact register.

The invention is therefore based on the problem of proposing a security element that is simple to produce, has both a light appearance and magnetic properties, and is still difficult to imitate due to its special magnetic properties.

SUMMARY OF THE INVENTION

The invention is characterized by the use of magnetic substances which themselves fulfill the optical requirements better, i.e. exist as light substances instead of having a dark or black inherent color, on the one hand, and have magnetic properties which are not usable in commercial magnetic tape technology and are thus not commercially available for manipulation, on the other hand.

Soft-magnetic pure iron meets these requirements excellently since it is producible as a light silver-gray pigment that can be processed in the same way as classical magnetic pigments, i.e. is also suitable for coating film tapes but is not usable for magnetic recording techniques since it has little or even no remanence. A safeguarding thread equipped with these pigments thus meets the requirements of both inexpensive production and difficult accessibility for forgers since it is not commercially available as a tape.

Soft-magnetic iron powder pigments have a high permeability and, due to their high iron content (typically 99.5%), they have a many times higher saturation magnetization than conventional oxidic pigments, so that even relatively small amounts are readily detectable by machine. Further properties are indicated in the BASF company's documents with respect to the carbonyl iron powder produced by this company.

Due to the lack of remanence the magnetic properties are difficult to detect using simple means; they are thus also difficult to recognize and analyze for forgers.

In the simplest case, the light gray to silvery pigments are mixed into a suitable varnish for the proposed applications and spread on a carrier material. The resulting light gray safeguarding thread is embedded in the security document in the customary way. The thin paper fiber coat makes the gray tint of the thread disappear so that it hardly appears in incident light.

Due to the stated special properties of the soft-magnetic pigments, such a safeguarding thread has a relatively high security standard even without additional physical properties. Furthermore, the physical properties differing greatly from those of customary magnetic safeguarding threads create a further authenticity element which permits a marking of security documents distinguishing them from others having magnetic safeguarding threads.

BRIEF DESCRIPTION OF THE DRAWINGS

Further embodiment examples and advantages shall be explained with reference to the figures, in which.

DETAILED DESCRIPTION OF PREFERRED EMBODIMENT(S)

Figure 1:
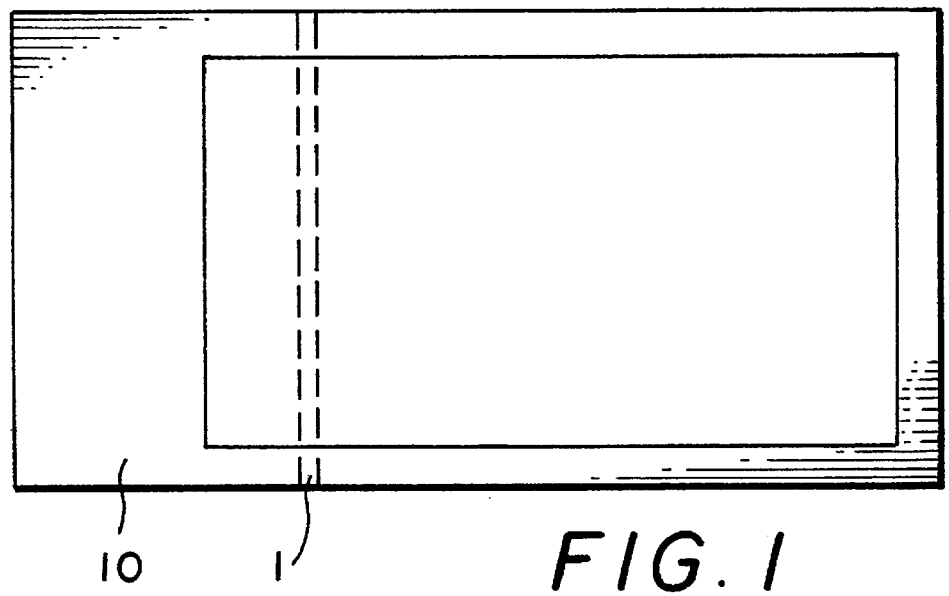
FIG. 1 shows a security document having an embedded security element.

FIG. 1 shows a bank note 10 having an embedded safeguarding thread according to the invention. The thread here is completely embedded in the paper material, which is indicated by the broken lines. However, it is also possible to incorporate the thread in the form of a so-called window safeguarding thread, so that it appears directly on the document surface at certain intervals. It is also possible to incorporate the security element in the form of planchets or mottling fibers at certain places in the security document, instead of in the form of a thread.

Figure 2:
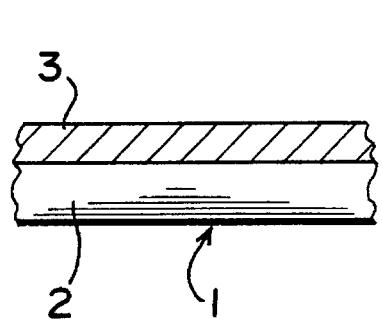
FIG. 2 shows a safeguarding thread with a light magnetic pigment coating.

FIG. 2 shows inventive safeguarding thread 1 in cross section. It has a light gray, almost silvery color and is produced by spreading a light soft-magnetic pigment mixed into a suitable varnish 3 onto a carrier material 2, e.g. a plastic film. A suitable pigment is e.g. CEP-SQ (BASF), which has hitherto been used mainly in electronics for ferromagnetic coil cores.

Figure 5:
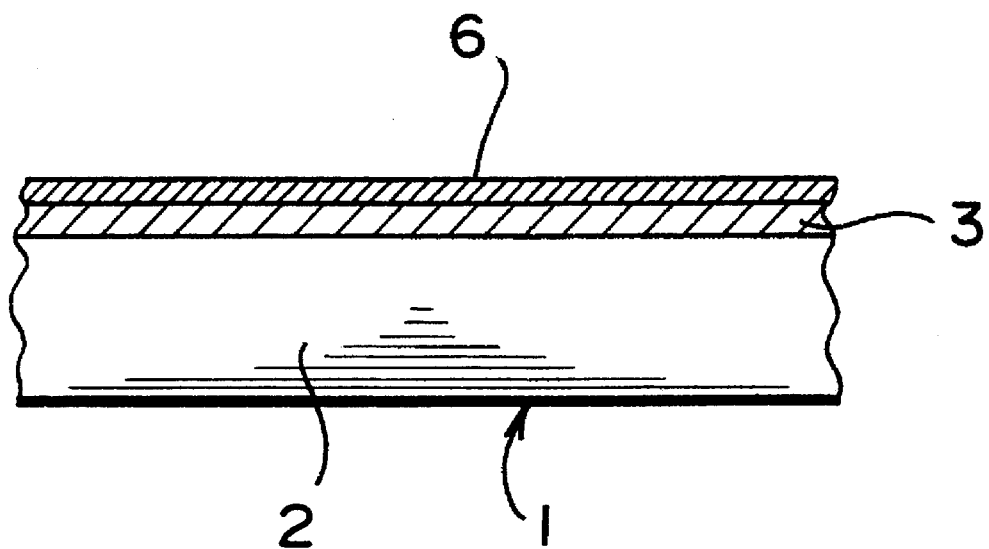
FIG. 5 shows the safeguarding thread of FIG. 2 with a color coding.

This pigment can optionally also be added to a white ink which is then applied to the carrier material. Since the pigments are even detectable in low concentrations, this makes it possible to vary the light appearance of the thread additionally. The same effect can be obtained by overprinting the gray thread material shown in FIG. 2 with a thin layer of white ink as illustrated in FIG. 5. This results in a security element which is hardly recognizable when the security document is viewed in incident light. If the security element need not fulfill this condition and is designed in color, the magnetic pigment can of course also be added to these dyes. Unlike conventional dark magnetic pigments, the light soft-magnetic pigments can even be mixed or overprinted with light dye solutions without the shade being impaired by the inherent color of the magnetic pigments. It is thus possible to produce colored magnetic patterns or characters having any desired design.

Processing is expediently done in sheets, which are finally cut into threads having the desired width and length.

Furthermore, the light soft-magnetic pigments can also be used very advantageously together with metallic strips containing negative characters.

Figure 3:
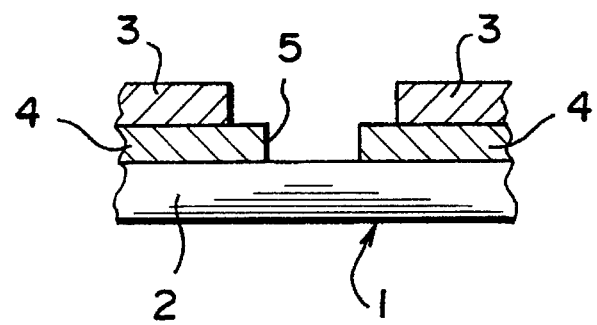
FIG. 3 shows a negative-print safeguarding thread with a light magnetic coating in cross section.

In this case, shown in FIG. 3, carrier material 2 is vacuum coated with a metal layer 4 in which recesses 5 are provided in the form of characters or patterns by methods known to the expert. Bars of light soft magnetic ink 3 are printed on in register and symmetrically with this negative writing.

Figure 4:
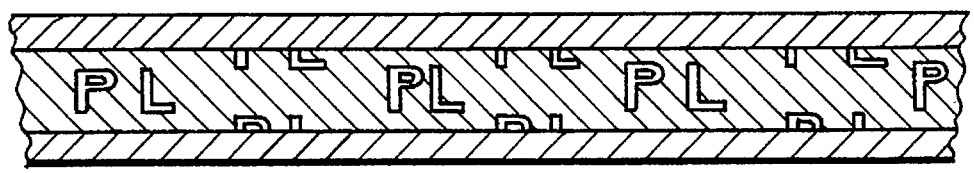
FIG. 4 shows a negative-print safeguarding thread with a light magnetic coating in a front view.

Such a thread is likewise produced in sheets which are then cut into strips. In a first method step a carrier film 2 is metallically coated all over and subsequently provided with negative writing by a method known e.g. from EP-A 0 330 733. The text is thereby applied in a parallel column arrangement in such a way as to be offset by half a line in adjacent columns as shown in FIG. 4. The strips of light soft-magnetic pigment are printed on parallel to characters 5, whereby one must make sure the light soft-magnetic strips 3 are disposed in lateral register with the negative writing.

Figure 6:
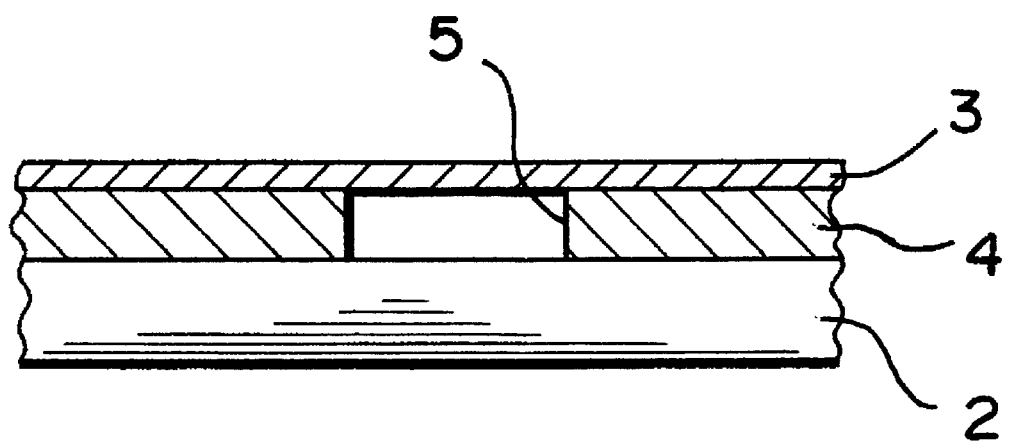
FIG. 6 shows a negative-print safeguarding thread with an all-over light magnetic coating in cross section.

Alternatively, (see FIG. 6) the layer containing the magnetic pigment 3 can also be applied all over the negative writing 5 and the surrounding metalization 4, whereby the magnetic layer 3 must be made so thin that it has sufficient transparency or permits a visual check of the negative characters 5 in transmitted light. If such a three-layer safeguarding thread is incorporated into the paper as a so-called window safeguarding thread, with the transparent carrier film disposed on the surface side of the paper of value as an outer layer for protecting the other layers, the resulting paper of value shows a simple safeguarding thread metalized over its entire surface in incident light, which can of course not be rendered in this form by copying apparatus. In transmitted light, however, the negative writing can be readily detected and checked visually.

Such a safeguarding thread thus not only has magnetic properties but is also electrically conductive and has micro-characters which are visually recognizable in transmitted light.

I claim:

1. In a security document having a security element in the form of a thread or film consisting of a substrate of plastic, said substrate including at least one electrically conductive metallic coating and at least one magnetic coating which is recognizable by machine, the improvement wherein said metallic coating includes recesses in the form of characters or patterns that are visually recognizable at least in transmitted light, and wherein said magnetic coating contains soft-magnetic pigments disposed at least in partial areas of said security element, and wherein said metallic and magnetic coatings are positioned one above the other.

2. The security document of claim 1, wherein said magnetic coating is disposed above said metallic coating in partial areas thereof, and wherein said metallic coating is provided with said visually recognizable characters in at least intermediate areas which are free of said magnetic coating.

3. The security document of claim 2 wherein said magnetic coating is arranged in strips along the length of said security element and symmetrically to both sides of said visually recognizable characters.

4. The security document of claim 1, wherein said magnetic coating is disposed above the entire surface of said metallic coating and provides sufficient transparency to enable recognition of said characters in transmitted light.

5. The security document of claim 1, wherein the magnetic coating comprises magnetic material consisting entirely of soft-magnetic pigments.

6. A security element for use within a security document, said security element comprising a substrate of plastic comprising at least one electrically conductive metallic coating and at least one magnetic coating which is recognizable by machine, the improvement wherein said metallic coating includes recesses in the form of characters or patterns which are visually recognizable at least in transmitted light, and wherein said magnetic coating contains soft-magnetic pigments disposed at least in partial areas of said security elements, and wherein said metallic and magnetic coatings are positioned one above the other.

7. The security element of claim 6 wherein said magnetic coating is disposed above said metallic coating in partial areas thereof, and wherein said metallic coating is provided with said visually recognizable characters in at least intermediate areas which are free of said magnetic coating.

8. The security element of claim 7 wherein said magnetic coating is arranged in strips along the length of said security element and symmetrically to both sides of said visually recognizable characters.

9. The security element of claim 6 wherein said magnetic coating being disposed above the entire surface of said metallic coating and provides sufficient transparency to enable recognition of said characters in transmitted light.

10. The security element as claimed in claim 6, wherein the magnetic coating comprises magnetic material consisting entirely of soft-magnetic pigments.

11. A method for producing a security document such as a banknote, identity card or the like, having a security element comprising a substrate of plastic having at least one electrically conductive metallic coating and at least one magnetic coating which is recognizable by machine, comprising the steps of:

a) providing a carrier film with at least a partial metallic coating comprising recesses in the form of characters or patterns that are visually recognizable at least in transmitted light;

b) applying above said metallic coating a magnetic coating in at least partial areas thereof, said magnetic coating containing soft-magnetic pigments;

c) cutting said film into a security element of predetermined form; and d) embedding said security element in said security document.

12. A method according to claim 11, wherein said step (b) includes applying a magnetic coating comprising a magnetic material consisting entirely of soft-magnetic pigments.

13. A method for producing a security element for use within a security document, said security element comprising a substrate of plastic comprising at least one electrically conductive metallic coating and at least one magnetic coating which is recognizable by machine, comprising the steps of:

a) providing a carrier film with at least a partial metallic coating, said metallic coating being provided with recesses in the form of characters or patterns that are visually recognizable at least in transmitted light;

b) applying above said metallic coating a magnetic coating in at least partial areas thereof, said magnetic coating containing soft-magnetic pigments;

c) cutting said film into security elements of predetermined form.

14. A method according to claim 13, wherein said step (b) includes applying a magnetic coating comprising a magnetic material consisting entirely of soft-magnetic pigments.

* * * * *